United States Patent [19]

Erwin et al.

[11] Patent Number: 5,660,016

[45] Date of Patent: Aug. 26, 1997

[54] FOAM-FILLED EXTRUDED DECKING PLANK AND DECKING ATTACHMENT SYSTEM

[75] Inventors: Ronald Dean Erwin, 134 Colonnade Dr., Peachtree City, Ga. 30269; Marvin Ray Whitley, Norcross, Ga.

[73] Assignee: Ronald Dean Erwin, Peachtree City, Ga.

[21] Appl. No.: 497,860

[22] Filed: Jul. 3, 1995

Related U.S. Application Data

[63] Continuation-in-part of Ser. No. 427,892, Apr. 26, 1995.
[51] Int. Cl.$^6$ .................................................. E04B 5/02
[52] U.S. Cl. .................. 52/483.1; 52/181; 52/309.9; 52/480; 52/586.2; 52/650.3; 52/737.4; 52/738.1; 52/762
[58] Field of Search .................... 52/650.3, 480, 52/586.1, 586.2, 585.1, 309.9, 263, 737.4, 738.1, 177, 181, 483.1, 762

[56] References Cited

U.S. PATENT DOCUMENTS

| | | | |
|---|---|---|---|
| 1,533,074 | 4/1925 | Denning | 52/586.2 |
| 3,680,530 | 8/1972 | Drawsky | 52/586.2 X |
| 3,764,245 | 10/1973 | Miyamoto . | |
| 3,881,984 | 5/1975 | Soda et al. . | |
| 3,957,250 | 5/1976 | Murphy . | |
| 4,045,603 | 8/1977 | Smith . | |
| 4,304,080 | 12/1981 | Freeman | 52/309.9 |
| 4,305,238 | 12/1981 | Harward . | |
| 4,433,519 | 2/1984 | Jenkins . | |
| 4,555,292 | 11/1985 | Thompson | 52/181 X |
| 4,602,765 | 7/1986 | Loper . | |
| 4,795,666 | 1/1989 | Okada et al. | 52/309.9 X |
| 4,834,585 | 5/1989 | Hasenwinkle . | |
| 4,889,669 | 12/1989 | Suzuki . | |
| 4,976,063 | 12/1990 | Young . | |
| 5,078,367 | 1/1992 | Simpson . | |
| 5,087,488 | 2/1992 | Cakmakci . | |
| 5,092,076 | 3/1992 | Terreta . | |
| 5,258,458 | 11/1993 | Christian . | |
| 5,271,878 | 12/1993 | Mizia . | |
| 5,360,295 | 11/1994 | Isacksen . | |
| 5,412,915 | 5/1995 | Johnson | 52/585.1 X |

FOREIGN PATENT DOCUMENTS

| | | | |
|---|---|---|---|
| 0013852 | 8/1980 | European Pat. Off. | 52/586.2 |

*Primary Examiner*—Christopher T. Kent
*Attorney, Agent, or Firm*—Arthur A. Gardner

[57] ABSTRACT

An extruded plastic decking plank for mounting to an underlying support structure, the plank having a rigid foam core, a resilient outer plastic shell, and a clamping portion for securing the plank to the support structure. The top surface of the plank can be provided with a non-slip surface. The invention also includes an attachment system for securing such decking planks to a support structure by engaging the clamping portions of the decking planks onto clamps or hold down blocks which are secured onto the support structure, and which permit relative motion between the planks and the structure in the planks' lengthwise direction to prevent stress and buckling caused by uneven expansion.

16 Claims, 2 Drawing Sheets

ND DECKING ATTACHMENT
FOAM-FILLED EXTRUDED DECKING PLANK AND DECKING ATTACHMENT SYSTEM

CROSS-REFERENCE TO RELATED APPLICATION

The present application is a continuation-in-part of U.S. patent application Ser. No. 08/427,892, filed Apr. 26, 1995.

TECHNICAL FIELD

The present invention is directed to foam-filled plastic extruded decking products, and a system for attaching decking to an underlying structure.

BACKGROUND OF THE INVENTION

Outdoor decks have become increasingly popular in residential home construction. Homes and apartments, as well as a variety of other buildings, often incorporate exterior decks into their design. Additionally, decks are commonly added onto existing structures. These decks provide convenient space for a variety of outdoor activities, including cookouts, dining and sunbathing, as well as other leisure activities. Exterior decks typically include a floor space fabricated from a number of decking planks, and an underlying support structure including posts, beams and joists.

Wood products have traditionally been the primary source of materials for use in decking construction. However, wood products are becoming increasingly scarce due to the harvesting of trees at ever faster rates and the rather limited rate at which timber resources can be replenished. Also, environmental concerns and environmental relations directed to conservation or preservation of forests tend to restrict the availability of wood products. With diminishing availability of timber resources, wood products are becoming increasingly expensive. There is, therefore, a substantial need for long-lasting substitute construction materials that can lessen the need to harvest timber resources.

It has been found that one potential approach to addressing the above need is to provide substitute replacement decking products made of plastic, rather than wood. Because the deck surface must support substantial weight and foot traffic, however, the replacement products need to be stable and rigid. The material should also be capable of economical manufacture, and be relatively expensive. It also needs to be easily fabricated and used in the field.

A variety of plastic building products are known. For example, U.S. Pat. No. 4,045,603 describes a three-layer synthetic construction material made from recycled waste thermoplastic synthetic resin material and cellulose fiber aggregate. This material includes face surfaces consisting essentially of re-hardened fused and rolled thermoplastic synthetic resin material bits, and an intervening core material consisting essentially of a compressed non-homogenous mixture of cellulose aggregate material bits and re-hardened fused thermoplastic synthetic resin material bits.

U.S. Pat. No. 3,764,245 describes an apparatus for producing light structural board of thermoplastic resin.

U.S. Pat. No. 5,253,458 describes a simulated log made from a cast polyvinylchloride (PVC) pipe, selectively filled with a hard cast foam or a bead type foam. This patent further describes that the cast PVC pipe is first manufactured and then subsequently filled with the foam filler.

These and other known synthetic building products, and methods for their production, tend to require excessive numbers of manufacturing operations at substantial cost. Additionally, known methods for manufacturing foam-filled extruded building products often result in uneven distribution of the foam within the interior of the extruded product, or insufficient bonding between the extruded shell and the foam core, resulting in products having insufficient strength and rigidity for application as a deck material.

The present invention is also directed to a novel attachment system for attaching foam filled extruded plastic decking planks to the deck's underlying support structure. Typical deck construction includes: (1) a number of vertical posts which support the remaining structure above the ground; (2) horizontal beams supported above the ground by the vertical posts; (3) a number of horizontal joists, parallel to and uniformly spaced apart from one another and anchored to the beams; and (4) a floor surface of decking planks arranged horizontally and perpendicular to the joists.

Traditionally, the decking planks have been wooden components of standard dimension, commonly 2×6 lumber. The traditional manner of attaching the decking planks to the underlying joists is by nailing or screwing through the plank into the joist below. Although this attachment method may be adequate for standard all-wood deck constructions, it does present a number of disadvantages. For example, nail or screw heads exposed on the top surface of the decking planks are not only aesthetically unappealing, but may present tripping hazards as well. This risk is enhanced over time, as the nails may be pried upwards away from the joists by flexing of the deck planks caused by repeated foot traffic. Additionally, the use of nails or screws necessarily creates holes in the decking planks which may cause the wood to split, and which may accelerate deterioration of the plank caused by weather or insects. Further disadvantages include increased difficulty of cleaning and/or painting the decking planks.

If the joists and the decking are fabricated from different materials of construction, the decking planks and the underlying joists may expand or contract at differing rates due to ambient temperature and humidity fluctuations. Such differences in rates of expansion and contraction can result in unacceptably uneven spacing, stress build-up within the construction components, cracking or buckling.

Accordingly, it can be seen that there is yet a need in the art for foam-filled extruded plastic decking components as a replacement for traditional wood products, which provide a strong finished deck at minimal cost, which resist wear from foot traffic, and which can be produced with a minimal number of manufacturing steps. It is to the provision of such decking components that the present invention is directed.

Accordingly, it can also be seen that a need yet exists for a decking attachment system which securely anchors the decking planks to the support structure while allowing for relative movement between plank and structure in the lengthwise direction of the plank. It is to the provision of such a decking attachment system that the present invention is also directed.

SUMMARY OF THE INVENTION

Briefly described, in a preferred form the present invention comprises a decking system for mounting to an underlying support structure, such as standard deck joists. The decking system includes a plurality of extruded plastic decking planks each having an expanded foam core surrounded by an extruded plastic outer shell. Each decking plank is roughly rectangular in cross-section, having a top, a bottom, and two sides. At least one side of each plank includes a clamping portion for attaching the plank to the support structure by means of a clamp. A plurality of clamps are positioned between adjacent planks for engaging the clamping portions of the sides of the planks, the clamps being securable to the support structure.

In preferred form, the present invention also comprises an extruded plastic decking plank for mounting to a support structure, such as deck joists. The decking plank includes a plastic outer shell having a top, a bottom, and two side portions, with at least one of its sides having a clamping portion for securing the plank to the support structure. The plastic outer shell surrounds an expanded foam core.

Accordingly, it is an object of the present invention to provide a foam-filled extruded decking plank which is economical in manufacture and application, durable, and simple.

It is another object of the present invention to provide a foam-filled extruded decking plank produced by a process which results in even distribution of the foam within the interior of the extruded decking plank.

It is another object of the present invention to provide a foam-filled extruded decking plank produced by a process which results in a strong bond between the extruded shell and the foam core.

A further object of the present invention is to provide a foam-filled extruded decking plank of sufficient strength and rigidity to provide a sturdy deck floor surface, and which resists wear from foot traffic.

Yet another object of the present invention is to provide an attachment system for attaching extruded decking to an underlying deck support structure.

These and other objects, advantages, and features of the invention will become more apparent upon reading the following specification in conjunction with the accompanying drawing figures.

BRIEF DESCRIPTION OF THE DRAWING FIGURES

DETAILED DESCRIPTION OF THE PREFERRED EMBODIMENTS

Figure 1:
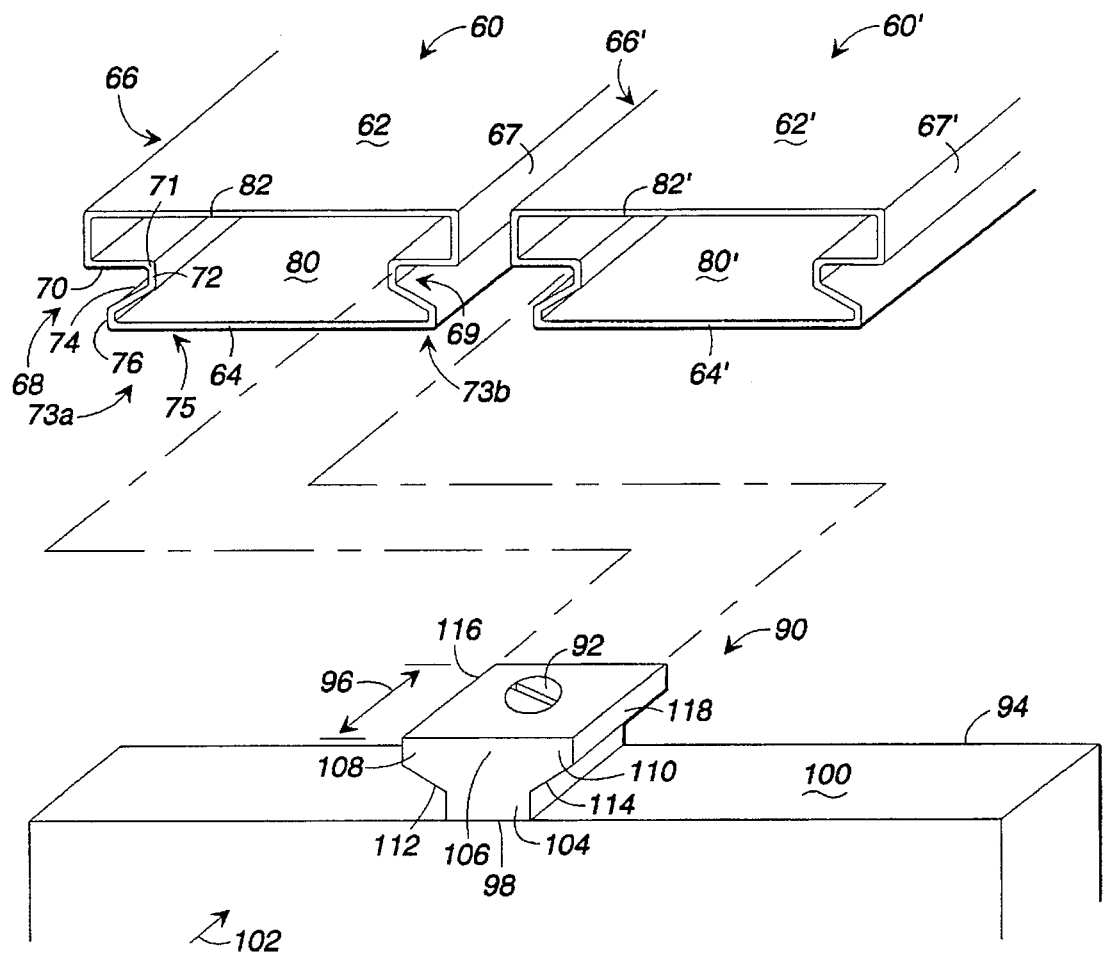
FIG. 1 shows, in cross section, a representative pair of foam-filled extruded decking planks according to a preferred form of the present invention, the planks being attached to a typical support joist by means of the attachment system of the present invention.

Referring now in detail to the drawing figures, in which like reference numerals represent like parts, FIG. 1 shows a representative pair of extruded foam-filled decking planks 60, 60' according to a preferred form of the present invention. Planks 60, 60' are extrusions of a predetermined size and shape, having top surfaces 62, 62', bottom surfaces 64, 64', and sides 66, 66', and 67, 67'.

Plank 60 will now be described in greater detail, it being understood that the construction of plank 60' is identical. Top surface 62 is an essentially flat planar surface, which can be slightly sloped or convex to improve drainage. Sides 66, 67 are each provided with a clamping portion 73a, 73b, such as channels 68, 69, which enables plank 60 to be fastened to the underlying deck support structure by means of the attachment system more fully described below. The clamping portion preferably includes a flange 75 for receiving a clamp or hold-down block 90 which secures the plank 60 to the underlying support structure or joist 94. If desired, an "end" plank may be fabricated with a clamping portion provided along one side only, the other side having a flat, finished surface.

For purposes of clarity, channel 68 will be described in detail, as representative of a typical preferred embodiment of the clamping portion of the decking plank 60. Channel 69 is the mirror image of channel 68. Channel 68 extends lengthwise (longitudinally) along side 66, and has a horizontal upper face 70, a vertical inner face 72, and an oblique lower face 74. Lower face 74 extends downwardly and outwardly away from vertical inner face 72. Lower face 74 terminates at a vertical outer face 76, which preferably is inset a small distance from side 66, such that bottom surface 64 is somewhat narrower than top surface 62.

The foam-filled extruded decking planks 60, 60' of the present invention comprise an expanded foam core 80, 80' and an outer resilient plastic shell 82, 82'. The decking planks 60, 60' of the present invention are produced by an extrusion process, described below, which provides even distribution of the foam core 80, 80' within the interior of the outer resilient plastic shell 82, 82', and which results in a strong bond between shell 82, 82' and core 80, 80'.

Decking planks 60, 60' are fabricated continuously, and can be of virtually any length. Planks 60, 60' preferably have width and length dimensions equal to those of standard wood lumber. Plastic shell 82, 82' can be fabricated with a simulated woodgrain outer surface and can be of a variety of colors.

In most instances, it is desirable to provide the top surfaces 62, 62' of the planks 60, 60' with a non-slip surface coating. This can be achieved by coating top surfaces 62, 62' with an acrylic paint, applying a grit material to the painted top surfaces 62, 62', and then applying a top coat of acrylic paint over the grit. Alternatively, the grit material may be mixed with the paint or other coating material prior to application to the top surfaces 62, 62' of the planks 60, 60'.

In its preferred form, the present invention further includes an attachment system for attaching the above-described decking planks to the underlying support structure of the deck. FIG. 1 shows a preferred embodiment of the decking attachment system of the present invention. The attachment system comprises a clamp, such as hold-down block or toe clamp 90, which is attached by a standard attachment means 92 to a joist or beam 94. Attachment means 92 preferably is a screw, but may, alternatively, be a nail or other equivalent fastener. Hold-down block 90 preferably is of a width 96 approximately equal to 1½ inches, the width of standard nominal "two-by" lumber. Alternatively, hold down block 90 can comprise a long strip which can be attached perpendicularly across a number of joists. Hold down blocks 90 preferably are fabricated from PVC plastic by injection molding.

As shown, hold down block 90 is a generally rectangular prismatic element having a flat rectangular lower surface 98 which rests on upper face 100 of joist 94 when installed. Viewed in the direction of direction arrow 102, hold down block 90 is generally T-shaped, having a narrow base portion 104 and a wider top portion 106. Top portion 106 further comprises a pair of dogs, 108, 110, which project horizontally outwardly above base portion 104. Each dog 108, 110 further comprises an oblique lower surface 112, 114, and a vertical side surface 116, 118.

Figure 2:
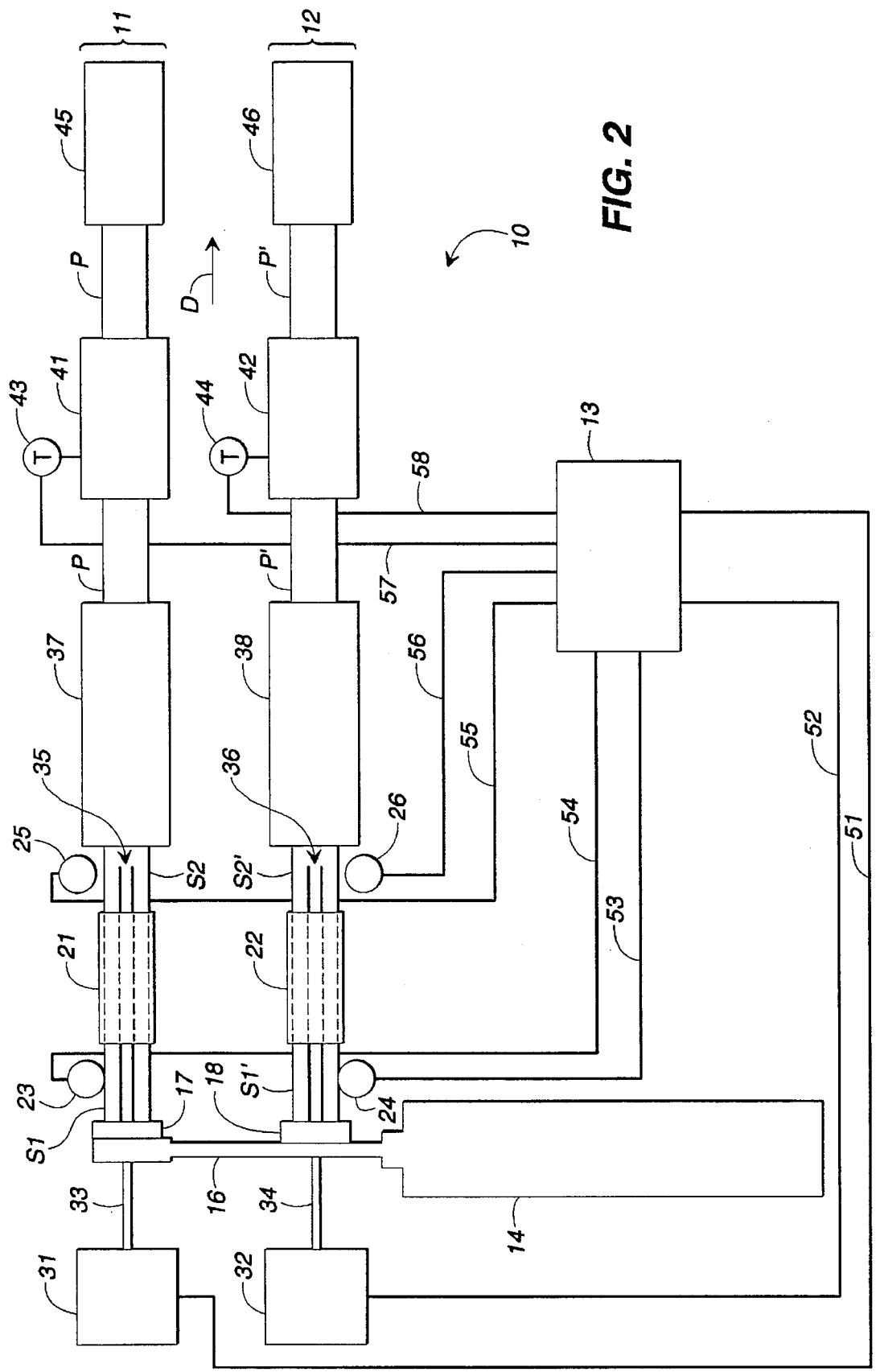
FIG. 2 is a schematic diagram of a system for carrying out the process for manufacturing a foam-filled extruded product according to a preferred form of the invention and showing various mechanical and electrical components for use therein in schematic form.

FIG. 2 shows a manufacturing system 10 for carrying out the process of manufacturing the above-described planks according to the invention. Manufacturing system 10 includes first and second extrusion lines 11 and 12, with two (2) lines shown for illustration purposes. Of course, those skilled in the art will readily recognize that only one extrusion line could be employed or that more than two extrusion lines could be employed, as desired. The extrusion lines 11 and 12 are each controlled by a common electronic controller 13. The electronic controller can take any of several known forms, such as a programmable logic controller (PLC) or a personal computer adapted for such application.

A common extruder 14 feeds both extrusion lines 11 and 12. The extruder can be of any number of known types, but typically includes an internal auger (not shown) for metering and pumping plastic pellets or powders and a heating element for heating the plastic pellets or powders to melt them to provide a heated thermoplastic discharge suitable for use in the extrusion lines. Moreover, as those skilled in the art will also understand, the extruder 14 typically is fed by known metering or blending equipment for providing a desired controlled quantity of plastic pellets to the extruder and/or for maintaining a preset recipe of plastic pellets or powder to provide a desired composition of the plastic to be extruded. The extruder output is heated thermoplastic which is forced through a "Y-block" or divider 16 for providing equal flows of plastic to first and second crosshead dies 17 and 18. These crosshead dies 17 and 18 are somewhat similar in construction and operation to those used to coat electric wire with an outer plastic insulation sheath. Each of the crosshead dies 17 and 18 includes an internal (unshown) mandrel or core element, which together with the outer (interior) surface of the crosshead die operate to define the shape and wall thickness of the extruded plastic product discharged from the crosshead dies.

Initial sizing and cooling sleeves 21 and 22 are positioned to receive the extruded product from the crosshead dies 17 and 18. These initial sizing and cooling sleeves 21 and 22 are conventional vacuum units. These initial sizing and cooling sleeves provide a rough initial shape and some initial cooling to stabilize the extruded plastic shell. The extruded plastic shell 82, 82' is indicated at S1 and S1' in FIG. 2. As depicted in the figure, the initial sizing and cooling sleeves 21 and 22 are spaced a short distance from the crosshead dies 17 and 18 to expose this section of the outer shell S1 and S1'. This then allows sensors to be positioned adjacent the outer shells S1 and S1' to detect any interruption in the extrusion of the outer shells. Such sensors are depicted at 23 and 24 in FIG. 2 and can take any number of known forms. For example, a photo emitter and a photo detector can be used to detect when there is a break in the extrusion. Alternatively, a motion sensor or proximity sensor can be used.

Another pair of similar sensors 25 and 26 are positioned downstream (after) the initial sizing and cooling sleeves 21 and 22. These second sensors 25 and 26 also operate to detect a break in the outer shell of the extrusion.

A pair of foam mixing and metering devices 31 and 32 pump metered quantities of liquid foam at controllable pressures through liquid foam supply conduits 33 and 34, preferably at room temperature. These liquid foam supply conduits 33 and 34 extend through the crosshead dies 17 and 18 and through the initial sizing and cooling sleeves 21 and 22. The open (discharge) ends 35 and 36 are positioned downstream of the initial sizing and cooling sleeves 21 and 22. Thus, the liquid foam is pumped and metered from the foam mixing and metering devices 31 and 32 through the crosshead dies 17 and 18 and through the initial cooling and sizing sleeves 21 and 22 and into the interior of the initially cooled and sized outer shells S2 and S2'.

Secondary sizing and cooling sleeves or tanks 37 and 38 are positioned downstream from the open discharge ends 35 and 36 of the liquid foam supply conduits 33 and 34. The open ends of liquid foam supply conduits 33 and 34 are positioned approximately 6" to 12" from the secondary sizing and cooling tanks 37 and 38 so that the liquid foam is allowed to drop away from the extrusion lines in the event that a break occurs. In this way, the secondary sizing and cooling sleeves 37 and 38 receive the extruded outer shells S2 and S2' (which have been initially cooled and sized), now filled with expanding or expanded foam which forms the foam cores 80, 82' of the extruded foam-filled decking planks of the present invention. The secondary sizing and cooling tanks provide the foaming and cross-linking reactions and cool the overall article, thereby causing the foam to solidify and the article to take the desired shape. These secondary sizing and cooling sleeves or tanks 37 and 38 further define the exterior dimensions and shape of the outer shell S2 and S2', with the discharge from these sleeves or tanks being a finished extruded product P and P'.

The secondary sizing and cooling sleeves or tanks 37 and 38 are rather long in comparison to the initial sizing and cooling sleeves 21 and 22 and utilize a water jacket or water film to minimize the friction between the shell S2 and S2' and the secondary sizing and cooling sleeves 37 and 38. The water film or jacket also helps to cool the outer shells S2 and S2' (and the liquid foam contained therein, now rapidly cooling and hardening to form a rigid structure). The water is preferably at a temperature of approximately 60° F. and the foam expands and sets within 30 to 45 seconds. The water also helps tend to avoid marring the external finish of the outer shells of the product P and P'. Furthermore, the secondary sizing and cooling sleeves preferably are coated with chrome or Teflon® to further reduce friction. The initial sizing and cooling sleeves 21 and 22 may also be coated with chrome or Teflon® if desired. The use of water jacketed sizing and cooling sleeves is known in the art in connection with very large diameter extrusions, such as 36-inch diameter plastic pipe. However, the use of such a water-jacketed sleeve in connection with small diameter extrusions (on the order of 12 inches or less) has not been known by the applicants heretofore. Nor have the applicants been aware of the use of both an initial sizing and cooling sleeve (21 and 22) together with a secondary sizing and cooling sleeve (37 and 38).

Pullers 41 and 42 operate to pull the extruded product P and P' along the extrusion lines 11 and 12. These pullers are of conventional design and include, for example, endless tracks which engage the outer surface of the extruded product for pulling the extruded product in a downstream direction (indicated by arrow D). Each of these pullers has associated therewith a torque sensor 43, 44 for monitoring the torque of the puller being applied to the product P and P'. If the torque exerted by the pullers 41 or 42 suddenly drops to zero or near zero, this is an indication that a break has occurred in the extrusion.

The product P and P' is further conveyed by the pullers 41 and 42 to a saw or other cut off device 45, 46 for cutting the extruded product P, P' into pieces of a predetermined or desired length.

Electrical cabling 51–58 connects the controller 13 with the foam mixing and metering devices 31 and 32 and with the sensors 23 and 24, 25 and 26, and 43 and 44.

In operation, liquid foam is pumped from the liquid foam mixing and metering devices 31 and 32 through the conduits 33 and 34 through the crosshead dies 17 and 18 and ultimately discharges at the discharge ends 35 and 36 into the interior of the semi-cooled outer shells S2 and S2'. This takes place at the same time as the extrusion of the outer shells by the crosshead dies 17 and 18, the initial sizing and cooling sleeves 21 and 22, and the secondary sizing and cooling sleeves 37 and 38.

This simultaneous injection of the liquid foam into the interior of the extruded shell during the extrusion process provides for superior bonding of the foam to the interior wall of the outer shell. This also provides for superior filling (avoiding voids) of the foam core 80, 80' in the interior of the outer shell 82, 82'. Another advantage of this simultaneous injection-extrusion process is that it minimizes the number of manufacturing steps or subsequent steps that have to be taken. This also tends to make the manufacture of the foam-filled extruded product very economical and requires a minimal amount of manufacturing floor space. The result is an economical, extremely strong final product.

The liquid foam preferably is polyurethane, but other materials such as polyesters and epoxies can be used as well. The outer polymer shell preferably is made from polyvinylchloride, but other materials such as acrylic, ABS, polyethylene, polypropylene, polycarbonate, and blends and alloys of two or more of these materials can be used. The polymer shell, once hardened, will preferably have a thickness ranging from 0.005 to 0.250 inches and the foam will preferably have a density ranging from 1 to 30 lbs/ft$^3$.

In operation, the attachment system of the present invention affixes planks 60, 60' to the joists 94 of the deck support structure by engaging the channels 68, 69 of the planks onto dogs 108, 110 of the hold down blocks 90. As shown by FIG. 1, if for example, planks 5½ inches wide by 1½ inches thick (nominal 2×6) are installed with ⅛ inch spacing between planks, hold down blocks 90 should be spaced 5 and ⅝ inches on center along the joists 94.

By attaching planks 60, 60' in this manner, the planks are securely affixed to the underlying support structure, while allowing relative motion between the planks and the structure in the planks' lengthwise direction. If ambient temperature and humidity fluctuations cause the planks and the underlying wooden support structure to expand or contract at different rates, dogs 108, 110 of hold-down block 90 will slide somewhat within the channel 68, 69 of the planks. In this manner, stress and deformation of the construction components is reduced or eliminated without sacrificing secure attachment of the planks to the structure.

While the invention has been disclosed in preferred forms, it will be apparent to those skilled in the art that many additions, deletions, and modifications may be made therein without departing within the spirit and scope of the invention as set forth in the following claims:

What is claimed is:

1. A decking system for mounting to a support structure, such as to deck joists, said decking system comprising:

a. a plurality of extruded plastic decking planks each comprising a plastic outer shell and an expanded foam core within said plastic outer shell and having a top, bottom, and sides, at least one of said sides comprising a clamping portion including a clamp-receiving recess formed in said at least one side; and b. a plurality of clamps positionable between adjacent ones of said planks for engaging said clamping portion of said at least one side of said planks, said clamps being shaped to be at least partly received in said recess, and wherein said clamps are securable to the support structure for securing said planks to the support structure.

2. The decking system of claim 1 wherein said clamping portion of said planks comprises a flange.

3. The decking system of claim 2 wherein said flange is bounded by said bottom of said plank and said recess which extends longitudinally in said side.

4. The decking system of claim 1 wherein said clamps are generally T-shaped.

5. The decking system of claim 1 wherein said tops of said extruded plastic decking planks comprise a non-slip surface.

6. The decking system of claim 1 wherein said recess of said clamping portion comprises a longitudinal channel formed in said at least one side of said planks and wherein said clamps comprise portions for engagement into said longitudinal channel.

7. An extruded plastic decking plank for mounting to a support structure, such as to deck joists, said decking plank comprising:

a. a plastic outer shell having top portion, said top portion having a top width, a bottom portion, said bottom portion having a bottom width, and two side portions, with at least one of said side portion comprising a clamping portion for securing said plank to the support structure, and wherein said top width is greater than said bottom width; and b. an expanded foam core within said plastic outer shell.

8. The decking plank of claim 7 wherein said clamping portion of said planks comprises a flange.

9. The decking plank of claim 8 wherein said flange is bounded by said bottom of said plank and a channel extending longitudinally in said at least one of said side portions.

10. The decking plank of claim 7 wherein said top portion of said extruded plastic decking plank comprises a non-slip surface.

11. The decking plank of claim 7 wherein said plastic shell is polyvinylchloride.

12. The decking plank of claim 7 wherein said expanded foam core comprises polyurethane.

13. The decking plank of claim 7 wherein said expanded foam core comprises polyester.

14. The decking plank of claim 7 wherein said expanded foam core comprises epoxy.

15. The decking plank of claim 10 wherein said non-slip surface comprises a grit material and an acrylic paint.

16. An extruded plastic decking plank for mounting to a support structure, such as to deck joists, said decking plank comprising:

a. a plastic outer shell having top, bottom, and two sides, with each of said sides comprising a channel-shaped clamping portion for securing said plank to the support structure, and wherein said sides are mirror-images of one another; and b. an expanded foam core within said plastic outer shell.

* * * * *